US008153548B2

(12) United States Patent
Khurshid et al.

(10) Patent No.: US 8,153,548 B2
(45) Date of Patent: Apr. 10, 2012

(54) ISOMERIZATION CATALYST

(75) Inventors: Muneeb Khurshid, Al-Khabar (SA);
Hideshi Hattori, Sapporo (JP);
Sulaiman Al-Khattaf, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 80 days.

(21) Appl. No.: 12/662,468

(22) Filed: Apr. 19, 2010

(65) Prior Publication Data

US 2011/0257007 A1    Oct. 20, 2011

(51) Int. Cl.
*B01J 23/00* (2006.01)
*B01J 23/58* (2006.01)
*B01J 23/42* (2006.01)
*B01J 23/44* (2006.01)
*B01J 23/04* (2006.01)

(52) U.S. Cl. ........ 502/308; 502/313; 502/317; 502/325; 502/330; 502/339; 502/344

(58) Field of Classification Search .................. 502/308, 502/313, 317, 325, 330, 339, 344
See application file for complete search history.

(56) References Cited

U.S. PATENT DOCUMENTS

| | | | |
|---|---|---|---|
| 3,993,554 A * | 11/1976 | Suggitt et al. ............ 204/157.83 |
| 5,422,327 A | 6/1995 | Soled et al. | |
| 5,510,309 A | 4/1996 | Chang et al. | |
| 5,648,589 A | 7/1997 | Soled et al. | |
| 5,780,382 A | 7/1998 | Chang et al. | |
| 5,837,641 A | 11/1998 | Gosling et al. | |
| 5,854,170 A * | 12/1998 | Chang et al. .................. 502/308 |
| 5,902,767 A * | 5/1999 | Kresge et al. ................. 502/308 |
| 6,080,904 A | 6/2000 | Chang et al. | |
| 6,124,232 A | 9/2000 | Chang et al. | |
| 6,338,791 B1 | 1/2002 | Ragil et al. | |
| 6,767,859 B2 | 7/2004 | Ying et al. | |
| 6,809,228 B2 | 10/2004 | Ducreux et al. | |
| 7,304,199 B2 | 12/2007 | Xu et al. | |
| 7,414,007 B2 | 8/2008 | Gillespie et al. | |
| 7,538,064 B2 | 5/2009 | Gillespie et al. | |
| 2004/0256289 A1 | 12/2004 | Gillespie et al. | |

FOREIGN PATENT DOCUMENTS

WO    WO 97/33689    9/1997
WO    WO 2004/024319    3/2004

* cited by examiner

*Primary Examiner* — Stanley Silverman
*Assistant Examiner* — Anthony J Zimmer
(74) *Attorney, Agent, or Firm* — Richard C. Litman

(57) ABSTRACT

The isomerization catalyst is a solid acid catalyst formed with a base of tungstated zirconium mixed oxides loaded with at least one hydrogenation/dehydrogenation metal catalyst from Groups 8-10 (IUPAC, 2006) and impregnated with at least one alkali metal from Group 1 (IUPAC, 2006). The metal from Groups 8-10 is preferably selected from platinum, palladium, ruthenium, rhodium, iridium, osmium and mixtures thereof, and most preferably is platinum. The Group I alkali metal is selected from lithium, sodium, potassium rubidium and cesium and mixtures thereof, and is preferably lithium, sodium, or potassium. Preferable, the catalyst forms, by weight, a base having between about 80-90% zirconium mixed oxides and between about 10-20% tungstate; between about 0.1-3.00% Group 8-10 metal; and between about 0.01-1.00% Group 1 alkali metal.

12 Claims, No Drawings

ISOMERIZATION CATALYST

BACKGROUND OF THE INVENTION

1. Field of the Invention

The present invention relates to catalysts for petroleum refining, and particularly to an isomerization catalyst for converting straight chain hydrocarbons, particularly $C_7$ and higher paraffins, to branched hydrocarbons in order to improve the octane rating of the feedstock.

2. Description of the Related Art

Ever since the advent of the internal combustion engine, gasoline and diesel fuel have been valuable commodities. Gasoline is a blend of hydrocarbons having a boiling point between 30-200° C. that is produced by distillation of crude oil. However, straight-run gasoline is a poor fuel because of the phenomenon of engine knock, which occurs when a portion of the air-fuel mixture in the combustion chamber ignites prematurely. Premature detonation experienced during engine knock causes engine wear from vibration, and severe knock may damage the engine.

It is known that engine knock is more severe with straight-chain hydrocarbons. Octane rating is improved with more branching in the hydrocarbons. One measure of the antiknock properties of gasoline is the octane number (diesel fuel uses a similar rating called the cetane number). There are two octane numbers of interest: the research octane number (RON) determined by testing that simulates driving under mild, cruising conditions; and the motor octane number (MON) that is determined by testing that simulates more severe conditions under load or at high speeds. In the U.S., the octane rating at the gas pump is the average of the RON and the MON. Heptane is assigned an octane rating of 0, while 2,2,4-trimethylpentane (isooctane) is assigned an octane number of 100. An engine performs best when the gasoline octane rating is matched to the compression ratio of the engine.

Most gasoline refining uses some form of catalytic cracking of $C_{11}$-$C_{14}$ kerosene to light hydrocarbons in the $C_3$-$C_5$ range, followed by catalytic reformation of the light hydrocarbons to highly branched $C_7$-$C_{10}$ hydrocarbons. Formerly, lead compounds, particularly tetraethyl lead, were used as gasoline additives to reduce knock. More recently, various oxygenated hydrocarbons, such as methyl test-butyl ether (MTBE) and ethanol have been used to increase the octane number and oxygenate gasoline for more complete combustion. However, the use of such additives, particularly lead and MTBE, has become more restricted and, in some instances, legally banned due to environmental and health concerns. In addition, refiners must limit the amount of aromatics and oxygenated compounds due to concerns about toxic gas emissions.

With decreasing demand for benzene and related light aromatic hydrocarbons and increasing demand for gasoline in industrial and developing nations, many refiners have shown renewed interest in isomerization of $C_5$-$C_{10}$ hydrocarbons to branched hydrocarbons for use in gasoline. Several effective catalysts are available for isomerization of $C_5$-$C_6$ feedstocks for this purpose, and many refiners include such isomerization units in their refineries. However, $C_7$-$C_{10}$ hydrocarbons have proven more difficult to isomerize efficiently due to cracking reactions and to excessive production of aromatics and oxygenated compounds as byproducts, which are difficult or expensive to separate, making the process uneconomical.

Thus, an isomerization catalyst solving the aforementioned problems is desired.

SUMMARY OF THE INVENTION

The isomerization catalyst is a solid acid catalyst formed with a base of tungstated zirconium mixed oxides loaded with at least one hydrogenation/dehydrogenation metal catalyst from Groups 8-10 (IUPAC, 2006) and impregnated with at least one alkali metal from Group 1 (IUPAC, 2006). The metal from Groups 8-10 is preferably selected from platinum, palladium, ruthenium, rhodium, iridium, osmium and mixtures thereof, and most preferably is platinum. The Group I alkali metal is selected from lithium, sodium, potassium rubidium and cesium and mixtures thereof, and is preferably lithium, sodium, or potassium. Preferable, the catalyst forms, by weight, a base having between about 80-90% zirconium mixed oxides and between about 10-20% tungstate; between about 0.1-3.00% Group 8-10 metal; and between about 0.01-1.00% Group 1 alkali metal. The catalyst is preferably formed by impregnating the Group 8-10 loaded tungstate zirconium mixed oxides with the Group I alkali metal and calcining the composition at between 300-1000° C. under oxidizing or neutral conditions.

Depending upon the calcining conditions, the process can be designed solely or selectively for the $C_{7+}$ fraction, or for naphtha cuts containing this fraction (e.g., $C_4$-$C_7$, $C_5$-$C_9$, $C_7$-$C_9$, $C_6$-$C_7$, $C_7$, $C_8$ or $C_9$, or $C_9$-$C_{12}$) and consisting mainly of paraffins/alkanes, and possibly naphthenes, aromatics, and olefins or alkenes. The product produced by using the isomerization catalyst on such feedstocks is primarily highly branched hydrocarbons that have been shown to increase the RON rating of the feedstock.

These and other features of the present invention will become readily apparent upon further review of the following specification.

DETAILED DESCRIPTION OF THE PREFERRED EMBODIMENTS

The present invention relates to an isomerization catalyst for use in the isomerization of $C_{7+}$ paraffin or naphtha cuts to branched hydrocarbons suitable for improving the RON of gasoline without substantial cracking of the produced multi-branched hydrocarbons. Multi-branched isomers are, in this case, defined as compounds containing more than one carbon atom having a bond to at least three other neighboring carbon atoms or containing at least one carbon atom having a bond to four neighboring carbon atoms. Mono-branched isomers are defined as compounds containing just one carbon atom with bonds to three neighboring carbon atoms.

The isomerization catalyst is a solid acid catalyst formed with a base of tungstated zirconium mixed oxides loaded with at least one hydrogenation/dehydrogenation metal catalyst from Groups 8-10 (IUPAC, 2006) and impregnated with at least one alkali metal from Group 1 (IUPAC, 2006). The metal from Groups 8-10 is preferably selected from platinum, palladium, ruthenium, rhodium, iridium, osmium and mixtures thereof, and most preferably is platinum. The Group I alkali metal is selected from lithium, sodium, potassium rubidium and cesium and mixtures thereof, and is preferably lithium, sodium, or potassium. Preferable, the catalyst forms, by weight, a base having between about 80-90% zirconium mixed oxides and between about 10-20% tungstate; between about 0.1-3.00% Group 8-10 metal; and between about 0.01-1.00% Group 1 alkali metal. The catalyst is preferably formed by impregnating the Group 8-10 loaded tungstate zirconium mixed oxides with the Group I alkali metal and calcining the composition at between 300-1000° C. under oxidizing or neutral conditions.

The process can be designed solely or selectively for the $C_{7+}$ fraction, or for naphtha cuts containing this fraction (e.g., $C_4$-$C_7$, $C_5$-$C_9$, $C_7$-$C_9$, $C_6$-$C_7$, $C_7$, $C_8$ or $C_9$, or $C_9$-$C_{12}$) and consisting mainly of paraffins/alkanes, and possibly naphthenes, aromatics, and olefins or alkenes. The product produced by using the isomerization catalyst on such feedstocks is primarily highly branched hydrocarbons that have been shown to increase the RON rating of the feedstock.

More particularly, the isomerization catalyst relates to a combination of two oxides and their use in catalytic production of multi-branched $C_{7+}$ isomers. The catalyst comprises zirconia and tungsten oxide, which are calcined and reacted together at high temperature and impregnated with a Group 8-10 (IUPAC, 2006) metal. A catalyst composition comprising a Group 8-10 (IUPAC, 2006) metal on mixed oxides behaves differently from a noble metal supported on tungstated zirconia. The catalyst composition prepared by the process described herein provides a very efficient and mechanically strong catalyst, which reaches high selectivity in $C_{7+}$ isomerization.

Isomerization proceeds on Brönsted acid sites, and acidity originates from the reaction between tungsten oxide and zirconia. Past studies had shown that high isomerization rates occur on samples with near saturation tungsten (W) surface densities. Such saturation typically occurs at around 15 wt % of tungsten loading. However, the present inventors have found that an excess of tungsten oxide, much above the formation of a tungsten oxide monolayer on a zirconia support, has a very positive effect on the selectivity of the catalyst. Unlike claimed in most of the references for $C_{5+}$ isomerization, the present inventors have found that an optimum for a $C_{7+}$ isomerization catalyst is in the range of 10% to 50%, most preferentially 20% to 40%. The excess of tungsten oxides might have a positive effect on the concentration of hydrogen on the catalyst surface, and therefore on hydrogen transfer and desorption of isomerization intermediates before their cracking to gas products. The zirconia used in this study for the preparation of the catalyst was dried at 120° C. and had a surface area above 300 m²/g.

The most typical tungsten precursor is ammonium metatungstate, due to its high solubility and low price. However, since the origin of these compounds plays a rather inferior role for the catalyst's quality, the list is not limited to the above-mentioned materials. The metal may be selected from any of the Group 8-10 (IUPAC, 2006) metals and mixtures thereof. The preferred metals are palladium and platinum with a concentration between 0.01 wt % to 5 wt %, most preferentially between 0.05 wt % to 1 wt %.

The process of manufacturing mechanically strong catalyst extrudates comprises the following steps: (a) kneading a mixture of zirconium and a tungsten precursor; (b) shaping the kneaded mixture into extrudates; (c) heating and calcining the mixture at 600-900° C., most preferentially at 650-800° C.; (d) impregnation of the catalyst with the Group 8-10 (IUPAC, 2006) metal; and (e) calcination of the resulting material at 300-700° C., most preferentially between 300-600° C.

This procedure can be modified as a matter of course. For example, mixed alumina and zirconia can be prepared by the co-precipitation of both precursors with ammonia, the tungsten precursor can be added after the alumina-zirconia extrudates have been made and calcined, Group 8-10 (IUPAC, 2006) metal can be added already before the first calcination step, etc. Calcination can take place under air replacement conditions. This could, for instance, be carried out at least once every minute, corresponding to a liquid hourly space velocity (LHSV) greater than 60 h$^{-1}$.

The $C_{4+}$ isomerization reaction on the above-mentioned catalyst proceeds in the presence of hydrogen with a hydrogen-to-hydrocarbon molar ratio between 0.1 to 5. Typical operating conditions are temperatures between 150-300° C., total pressures varying between 1 and 40 bars, and liquid space velocities (LHSV) between 0.1 to 30 h$^{-1}$. The preferred conditions are temperatures between 130-250° C., LHSV=0.5-5 h$^{-1}$, pressures between 5-15 bar, and a hydrogen-to-hydrocarbon ratio between 1 and 3. The feed may optionally also include shorter paraffins, aromatics or cycloparaffins. When passing such a feed through the reactor bed, shorter paraffins are also isomerized, while equilibrium is established between aromatics and corresponding cycloalkanes. At typical reaction temperatures, the equilibrium is shifted towards cycloalkanes. The reaction rate for ring opening will be very slow.

The selectivity of $C_7$ isomerization was calculated according to the following relationship:

$$\text{Isomerization selectivity (\%)} = \frac{\text{Total isomeric compounds in the product}}{C_7 \text{ conversion (\%)}} \times 100$$

The isomerization catalyst will be better understood by reference to the following examples.

Example 1

This example illustrates the preparation of sodium-promoted and -supported, platinum-modified, tungstated zirconia mixed oxide [0.010 wt % Na; 0.75 wt % Pt; 11 wt % $WO_3$—$ZrO_2$]. An amount (0.743 g) of ammonium metatungstate octadecahydrate ($H_{26}N_6O_{41}W_{21} \cdot 18H_2O$) was dissolved in 3.72 ml of distilled water. The solution was poured into a beaker containing 5.73 g of hydrous zirconia ($ZrO_2 \cdot xH_2O$). The resulting slurry was mixed thoroughly with a glass rod and was kept in an oven at 100° C. for 1 hour. The dried slurry was then calcined at 780° C. in air at 10° C./min heating rate and kept at this temperature for 3 hours to obtain $WO_3$—$ZrO_2$. An amount of sodium acetate, 1.07 mg, was dissolved in 1.5 ml of distilled water. The solution was transferred to a beaker containing 3.0 g of $WO_3$—$ZrO_2$. The resulting slurry was mixed thoroughly and dried in an oven at 100° C. and kept at this temperature for 1 hour. The resultant solid was then calcined at 450° C. in air at 10° C./min heating rate and kept at this temperature for 1 hour to obtain Na—$WO_3$—$ZrO_2$. 56.25 mg of hydrogen hexachloroplatinate hydrate ($H_2[PtCl_6] \cdot xH_2O$, having 40 wt % Pt) was dissolved in 1.5 ml of distilled water. The solution was added to a beaker containing 3.0 g of Na—$WO_3$—$ZrO_2$, mixed well and then dried in an oven at 100° C., kept at this temperature for 1 hour, followed by calcination at 450° C. (10° C./min heating rate) in air, and kept at this temperature for 3 hours. The recovered powdered catalyst had the following elemental composition: sodium (Na), 0.010 wt %; platinum (Pt), 0.75 wt %; tungsten oxide ($WO_3$), 11 wt %; and the balance was zirconium oxide ($ZrO_2$).

Example 2

This example illustrates the preparation of sodium-promoted and -supported, platinum-modified, tungstated zirconia [0.025 wt % Na; 0.75 wt % Pt; 11 wt % $WO_3$—$ZrO_2$]. An amount (0.743 g) of ammonium metatungstate octadecahydrate ($H_{26}N_6O_{41}W_{21} \cdot 18H_2O$) was dissolved in 3.72 ml of distilled water. The solution was poured into a beaker containing 5.73 g of hydrous zirconia ($ZrO_2 \cdot xH_2O$). The resulting slurry was mixed thoroughly with a glass rod and was kept at this temperature in an oven at 100° C. for 1 hour. The dried slurry was then calcined at 780° C. in air and kept at this temperature for 3 hours to obtain $WO_3$—$ZrO_2$. 2.68 mg of sodium acetate was dissolved in 1.5 ml of distilled water. The solution was transferred to a beaker containing 3.0 g of $WO_3$—$ZrO_2$. The resulting slurry was mixed thoroughly and dried in an oven at 100° C. for 1 hour. It was then calcined at 450° C. in air and was kept at this temperature for 1 hour to obtain Na—$WO_3$—$ZrO_2$. 56.25 mg of hydrogen hexachloroplatinate hydrate ($H_2[PtCl_6] \cdot xH_2O$, 40 wt % Pt) was dissolved in 1.5 ml of distilled water. The solution was added to a beaker containing 3.0 g of Na—$WO_3$—$ZrO_2$. The slurry was mixed and then dried in an oven at 100° C. and kept at this temperature for 1 hour, followed by calcination at 450° C. in air, and kept at this temperature for 3 hours. The recovered white, powdered catalyst had the following elemental composition: sodium, 0.025 wt %; platinum, 0.75 wt %; tungsten oxide, 11 wt %; and the balance was zirconium oxide.

Example 3

This example illustrates the preparation of sodium-promoted and -supported, platinum-modified, tungstated zirconia [0.05 wt % Na; 0.75 wt % Pt; 11 wt % $WO_3$—$ZrO_2$]. An amount (0.743 g) of ammonium metatungstate octadecahydrate ($H_{26}N_6O_{41}W_{21} \cdot 18H_2O$) was dissolved in 3.72 ml of distilled water. The solution was poured into a beaker containing 5.73 g of hydrous zirconia ($ZrO_2 \cdot xH_2O$). The resulting slurry was mixed thoroughly with a glass rod and kept at 100° C. in an oven for 1 hour. The dried slurry was then calcined at 780° C. in air for 3 hours to obtain $WO_3$—$ZrO_2$. 5.35 mg of sodium acetate was dissolved in 1.5 ml of distilled water. The solution was transferred to a beaker containing 3.0 g of $WO_3$—$ZrO_2$. The resulting slurry was mixed thoroughly and dried in an oven at 100° C. and kept at this temperature for 1 hour. It was then calcined at 450° C. in air for 1 hour to obtain Na—$WO_3$—$ZrO_2$. 56.25 mg of hydrogen hexachloroplatinate hydrate ($H_2[PtCl_6] \cdot xH_2O$, 40 wt % Pt) was dissolved in 1.5 ml of distilled water. The solution was added to a beaker containing 3.0 g of Na—$WO_3$—$ZrO_2$. The slurry was mixed and then dried in an oven at 100° C. and kept at this temperature for 1 hour, followed by calcination at 450° C. in air, and kept at this temperature for 3 hours. The recovered white, powdered catalyst had the following elemental composition: sodium, 0.050 wt %; platinum, 0.75 wt %; tungsten oxide, 11 wt %; and the balance was zirconium oxide.

Example 4

This example illustrates the preparation of platinum-modified tungstated zirconia, [0.75 wt % Pt; –11 wt % $WO_3$—$ZrO_2$]. An amount (0.743 g) of ammonium metatungstate octadecahydrate ($H_{26}N_6O_{41}W_{21} \cdot 18H_2O$) was dissolved in 3.72 ml of distilled water. The solution was poured into a beaker containing 5.73 g of hydrous zirconia ($ZrO_2 \cdot xH_2O$). The resulting slurry was mixed thoroughly with a glass rod and was kept in an oven at 100° C. and kept at this temperature for 1 hour. The dried slurry was then calcined at 780° C. in air and kept at this temperature for 3 hours to obtain $WO_3$—$ZrO_2$. 56.25 mg of hydrogen hexachloroplatinate hydrate ($H_2[PtCl_6] \cdot xH_2O$, 40 wt % Pt) was dissolved in 1.5 ml of distilled water. The solution was added to a beaker containing 3.0 g of $WO_3$—$ZrO_2$. The slurry was mixed and then dried in an oven at 100° C. and kept at this temperature for 1 hour, followed by calcination at 450° C. in air, and was kept at this temperature for 3 hours. The recovered powdered catalyst had the following elemental composition: platinum, 0.75 wt %; tungsten oxide, 11 wt %; and the balance was zirconium oxide.

Example 5

This example illustrates the preparation of platinum-modified, tungstated zirconia [1.0 wt % Pt-11 wt % $WO_3$—$ZrO_2$]. An amount (0.743 g) of ammonium metatungstate octadecahydrate ($H_{26}N_6O_{41}W_{21} \cdot 18H_2O$) was dissolved in 3.72 ml of distilled water. The solution was poured into a beaker containing 5.73 g of hydrous zirconia ($ZrO_2 \cdot xH_2O$). The resulting slurry was mixed thoroughly with a glass rod and was kept in an oven at 100° C. for 1 hour. The dried slurry was then calcined at 780° C. in air and was kept at this temperature for 3 hours to obtain $WO_3$—$ZrO_2$. 75.0 mg of hydrogen hexachloroplatinate hydrate ($H_2[PtCl_6] \cdot xH_2O$, 40 wt % Pt) was dissolved in 1.5 ml of distilled water. The solution was added to a beaker containing 3.0 g of $WO_3$—$ZrO_2$. The slurry was mixed and then dried in an oven at 100° C. and kept at this temperature for 1 hour, followed by calcination at 450° C. in air, and was kept at this temperature for 3 hours. The recovered powdered catalyst had the following elemental composition: platinum, 1.0 wt %; tungsten oxide, 11 wt %; and the balance was zirconium oxide.

Example 6

This example illustrates the preparation of platinum-modified, tungstated zirconia [1.5 wt % Pt-11 wt % $WO_3$—$ZrO_2$]. An amount (0.743 g) of ammonium metatungstate octadecahydrate ($H_{26}N_6O_{41}W_{21} \cdot 18H_2O$) was dissolved in 3.72 ml of distilled water. The solution was poured into a beaker containing 5.73 g of hydrous zirconia ($ZrO_2 \cdot xH_2O$). The resulting slurry was mixed thoroughly with a glass rod and was kept in an oven at 100° C. and kept at this temperature for 1 hour. The dried slurry was then calcined at 780° C. in air and kept at this temperature for 3 hours to obtain $WO_3$—$ZrO_2$. 37.50 mg of hydrogen hexachloroplatinate hydrate ($H_2[PtCl_6] \cdot xH_2O$, 40 wt % Pt) was dissolved in 1.5 ml of distilled water. The solution was added to a beaker containing 3.0 g of $WO_3$—$ZrO_2$. The slurry was mixed and then dried in an oven at 100° C. and kept at this temperature for 1 hour, followed by calcination at 450° C. in air, and kept at this temperature for 3 hours. The recovered powdered catalyst had the following elemental composition: platinum, 1.5 wt %; tungsten oxide, 11 wt %; and the balance was zirconium oxide.

Example 7

This example illustrates the isomerization reaction of n-heptane over sodium-modified, platinum-supported, tungstated zirconia prepared as in Example 1. The catalytic reactions were carried out in a high pressure fixed bed reactor (BTRS-Jr®, manufactured by Autoclave Engineers, USA). This reactor consisted of a reactor tube, feed mixer/vaporizer oven, sample valve, status valve, back pressure regulator body, and pressure transducer isolator. The reactor size was 10 ml with ID of 0.25 inch, and can be heated up to temperature of 600° C. The maximum pressure limit of the system was 300 bars.

The liquid n-heptane was fed to the reactor using an HPLC pump equipped with an automatic feed flow controller. The liquid feed was passed through the mixer/vaporizer, which was maintained at 150° C., for blending with hydrogen gas, and a single, homogeneous stream is created to be fed to the reactor. Hydrogen gas flow rate was controlled using an automatic gas mass flow controller.

The reactor tube was packed with 400 mg of the said catalyst. A small amount of glass wool was placed before and after the catalyst to insure good packing of the catalyst. The reactor tube was fitted in the system and was checked for any leaks. The mass flow controller was turned on, and the hydrogen flow rate was set at 30 ml/min. The reactor was put online, and its temperature was increased to 400° C. The catalyst was reduced at this temperature for 1 hour under flowing hydrogen. After reduction, the reactor temperature was reduced to 300° C. At the same time, the hydrogen flow rate was set to 100 ml/min. The back pressure regulator was adjusted to set the hydrogen pressure at 3.53 bars. At this point, the reactor was switched to offline mode. The oven temperature was raised to 150° C. The HPLC pump was turned on, and the liquid n-heptane flow rate was set at 0.08 ml/min. The partial pressure of n-heptane was kept constant at 0.47 bar. The system was allowed to stabilize for some time until a smooth flow of feed was observed from the waste line of the reactor. At this point, the reactor was switched back to online mode. The isomerization reaction was monitored by analyzing the product stream using an online capillary column gas chromatograph equipped with a flame ionization detector. The products were identified by comparison with authentic samples. Since deactivation of catalyst with time on stream was negligible, the conversions of n-heptane at different temperatures were measured successively. The reaction temperature was changed stepwise to 300° C., followed by 280° C. At both of these temperatures, the reaction system was stabilized for 20-50 minutes before sampling the products for analysis. Detailed product composition obtained using this example is shown in Table 1. The results obtained at different reaction conditions, showing n-$C_7$ conversion and isomerization selectivity are summarized in Table 2. The product has a RON value of 38.3.

TABLE 1

Reaction products at 280° C.

| Component | Wt % |
| --- | --- |
| Propane | 0.33 |
| Isobutane | 0.60 |
| n-Butane | 0.31 |
| Isopentanes | 0.14 |
| Isohexanes | 0.27 |
| 2,4-Dimethylpentane | 3.45 |
| 2,2-Dimethylpentane | 3.66 |
| 2,2,3-Trimethylbutane | 0.45 |
| 3,3-Dimethylpentane | 2.19 |
| 2-Methylhexane | 22.59 |
| 2,3-Dimethylpentane | 6.03 |
| 3-Methylhexane | 25.34 |
| 3-Ethylpentane | 2.07 |
| n-Heptane | 32.50 |

TABLE 2

Conversion and selectivity for n-heptane isomerization

| Reaction Temperature (° C.) | Pressure (bar) | $H_2$ flowrate (ml/min) | $C_7$ conversion (%) | Isomerization selectivity (%) |
| --- | --- | --- | --- | --- |
| 280 | 13 | 100 | 60.8 | 98.3 |
| 280 | 15 | 100 | 67.5 | 97.4 |

TABLE 2-continued

Conversion and selectivity for n-heptane isomerization

| Reaction Temperature (° C.) | Pressure (bar) | $H_2$ flowrate (ml/min) | $C_7$ conversion (%) | Isomerization selectivity (%) |
| --- | --- | --- | --- | --- |
| 300 | 10 | 150 | 72.5 | 94.3 |
| 300 | 10 | 200 | 65.6 | 95.9 |

Example 8

This example illustrates the isomerization of n-heptane over sodium-modified, platinum-supported, tungstated zirconia prepared as in Example 2. Following the procedure of Example 7, the reactor tube was packed with 400 mg of catalyst and the performance was monitored at 300° C. The products composition is given in Table 3. The results obtained at different reaction conditions, showing n-$C_7$ conversion and isomerization selectivity, are summarized in Table 4. The product was found to have RON value of 35.7.

TABLE 3

Reaction products at 300° C.

| Component | Wt % |
| --- | --- |
| Propane | 1.50 |
| Isobutane | 1.65 |
| n-Butane | 0.44 |
| Isopentanes | 0.07 |
| Isohexanes | 0.07 |
| 2,4-Dimethylpentane | 3.10 |
| 2,2-Dimethylpentane | 3.73 |
| 2,2,3-Trimethylbutane | 0.32 |
| 3,3-Dimethylpentane | 1.66 |
| 2-Methylhexane | 21.98 |
| 2,3-Dimethylpentane | 5.28 |
| 3-Methylhexane | 23.92 |
| 3-Ethylpentane | 1.90 |
| n-Heptane | 34.33 |

TABLE 4

Conversion and selectivity for n-heptane isomerization

| Reaction Temperature (° C.) | Pressure (bar) | $H_2$ flowrate (ml/min) | $C_7$ conversion (%) | Isomerization selectivity (%) |
| --- | --- | --- | --- | --- |
| 300 | 3 | 50 | 65.7 | 94.2 |
| 300 | 3 | 100 | 47.9 | 99.3 |

Example 9

This example illustrates the isomerization of n-heptane over sodium-modified, platinum-supported, tungstated zirconia prepared as in Example 3. Following the procedure of Example 7, the reactor tube was packed with 400 mg of catalyst and the performance was monitored at 300-315° C. The results are summarized in Table 5. The results obtained at different reaction conditions showing n-$C_7$ conversion and isomerization selectivity are summarized in Table 6. The product was found to have RON value of 29.3.

TABLE 5

Reaction products at 315° C.

| Component | Wt % |
| --- | --- |
| Propane | 1.20 |
| Isobutane | 1.29 |
| n-Butane | 0.38 |
| Isopentanes | 0.06 |
| Isohexanes | 0.06 |
| 2,4-Dimethylpentane | 1.93 |
| 2,2-Dimethylpentane | 2.71 |
| 2,2,3-Trimethylbutane | 0.19 |
| 3,3-Dimethylpentane | 1.12 |
| 2-Methylhexane | 19.10 |
| 2,3-Dimethylpentane | 4.09 |
| 3-Methylhexane | 21.12 |
| 3-Ethylpentane | 1.74 |
| n-Heptane | 44.86 |

TABLE 6

Conversion and selectivity for n-heptane isomerization

| Reaction Temperature (° C.) | Pressure (bar) | $H_2$ flowrate (ml/min) | $C_7$ conversion (%) | Isomerization selectivity (%) |
| --- | --- | --- | --- | --- |
| 300 | 3 | 100 | 43.8 | 96.8 |
| 300 | 5 | 50 | 52.6 | 93.5 |
| 315 | 3 | 50 | 55.1 | 94.3 |

Example 10

This example illustrates the isomerization of n-heptane over platinum-supported, tungstated zirconia, prepared as in Example 4. Following the procedure of Example 7, the reactor tube was packed with 400 mg of catalyst and the performance was monitored at 280-300° C. The results are summarized in Table 7. The results obtained at different reaction conditions showing n-$C_7$ conversion and isomerization selectivity are summarized in Table 8. The product was found to have RON value of 44.9.

TABLE 7

Reaction products at 280° C.

| Component | Wt % |
| --- | --- |
| Propane | 4.39 |
| Isobutane | 5.28 |
| n-Butane | 1.10 |
| Isopentanes | 0.24 |
| Isohexanes | 0.24 |
| 2,4-Dimethylpentane | 6.25 |
| 2,2-Dimethylpentane | 6.18 |
| 2,2,3-Trimethylbutane | 0.81 |
| 3,3-Dimethylpentane | 3.12 |
| 2-Methylhexane | 23.00 |
| 2,3-Dimethylpentane | 7.40 |
| 3-Methylhexane | 24.30 |
| 3-Ethylpentane | 1.81 |
| n-Heptane | 15.75 |

TABLE 8

Conversion and selectivity for n-heptane isomerization

| Reaction Temperature (° C.) | Pressure (bar) | $H_2$ flowrate (ml/min) | $C_7$ conversion (%) | Isomerization selectivity (%) |
| --- | --- | --- | --- | --- |
| 300 | 3 | 100 | 79.1 | 80.2 |
| 300 | 3 | 200 | 64.2 | 88.4 |
| 300 | 3 | 150 | 75.1 | 83.6 |
| 280 | 20 | 150 | 84.2 | 86.5 |
| 280 | 25 | 150 | 84.3 | 86.1 |

Example 11

This example illustrates the isomerization of n-heptane over platinum-supported, tungstated zirconia prepared as in Example 5. Following the procedure of Example 7, the reactor tube was packed with 400 mg of catalyst and the performance was monitored at 280-300° C. The product composition results are summarized in Table 9. The results obtained at different reaction conditions, showing n-$C_7$ conversion and isomerization selectivity, are summarized in Table 10. The product was found to have RON value of 38.9.

TABLE 9

Reaction products at 300° C.

| Component | Wt % |
| --- | --- |
| Propane | 8.00 |
| Isobutane | 9.31 |
| n-Butane | 1.55 |
| Isopentanes | 0.23 |
| Isohexanes | 0.18 |
| 2,4-Dimethylpentane | 4.27 |
| 2,2-Dimethylpentane | 4.81 |
| 2,2,3-Trimethylbutane | 0.78 |
| 3,3-Dimethylpentane | 2.65 |
| 2-Methylhexane | 20.18 |
| 2,3-Dimethylpentane | 6.82 |
| 3-Methylhexane | 22.51 |
| 3-Ethylpentane | 1.92 |
| n-Heptane | 16.75 |

TABLE 10

Conversion and selectivity for n-heptane isomerization

| Reaction Temperature (° C.) | Pressure (bar) | $H_2$ flowrate (ml/min) | $C_7$ conversion (%) | Isomerization selectivity (%) |
| --- | --- | --- | --- | --- |
| 280 | 3 | 100 | 67.6 | 93.1 |
| 300 | 3 | 100 | 83.1 | 76.6 |

Example 12

This example illustrates the isomerization of n-heptane over platinum-supported, tungstated zirconia as specified in Example 6. Following the procedure of Example 7, the reactor tube was packed with 400 mg of catalyst and the performance was monitored at 280-300° C. The product composition results are summarized in Table 11. The results obtained at different reaction conditions showing n-$C_7$ conversion and isomerization selectivity are summarized in Table 12. The product was found to have RON value of 39.8.

TABLE 11

Reaction products at 300 C.

| Component | Wt % |
|---|---|
| Propane | 7.56 |
| Isobutane | 8.80 |
| n-Butane | 1.46 |
| Isopentanes | 0.22 |
| Isohexanes | 0.18 |
| 2,4-Dimethylpentane | 4.72 |
| 2,2-Dimethylpentane | 4.94 |
| 2,2,3-Trimethylbutane | 0.88 |
| 3,3-Dimethylpentane | 2.96 |
| 2-Methylhexane | 20.34 |
| 2,3-Dimethylpentane | 6.90 |
| 3-Methylhexane | 22.36 |
| 3-Ethylpentane | 1.76 |
| n-Heptane | 16.83 |

TABLE 12

Conversion and selectivity for n-heptane isomerization

| Reaction Temperature (° C.) | Pressure (bar) | $H_2$ flowrate (ml/min) | $C_7$ conversion (%) | Isomerization selectivity (%) |
|---|---|---|---|---|
| 280 | 3 | 100 | 70.1 | 93.0 |
| 300 | 3 | 100 | 83.2 | 78.0 |

Thus, isomerization of n-heptane is a very attractive conversion process. It produces high octane number isoheptanes. The octane number of the feed can be increased significantly from 0 to between about 43-112. By developing novel, active and highly selective catalysts, n-heptane can be converted efficiently and selectively into isoheptanes with minimal fuel loss and gas formation. This isomerate can be blended into a gasoline pool to increase the octane number, and it can replace aromatics to achieve environmentally friendly automotive fuel with a high octane number.

It is to be understood that the present invention is not limited to the embodiments described above, but encompasses any and all embodiments within the scope of the following claims.

We claim:

1. An isomerization catalyst, comprising:
a base of tungstated zirconia;
a hydrogenation/dehydrogenation component loaded on the base, the hydrogenation/dehydrogenation component including at least one metal selected from the group consisting of platinum, palladium, ruthenium, rhodium, iridium, and osmium; and
an alkali metal impregnated on the hydrogenation/dehydrogenation component-loaded base, wherein the catalyst comprises, by weight:
between about 10-20% tungsten oxide;
between about 0.1-3.00% hydrogenation/dehydrogenation component;
between about 0.01-1.00% alkali metal; and
the balance being zirconia.

2. The isomerization catalyst according to claim 1, wherein said at least one metal hydrogenation/dehydrogenation component is selected from the group consisting of platinum and palladium.

3. The isomerization catalyst according to claim 1, wherein said at least one metal hydrogenation/dehydrogenation component comprises platinum.

4. The isomerization catalyst according to claim 1, wherein said alkali metal is selected from the group consisting of lithium, sodium, potassium, rubidium, cesium, and mixtures thereof.

5. The isomerization catalyst according to claim 1, wherein said alkali metal is selected from the group consisting of lithium, sodium, potassium, and mixtures thereof.

6. The isomerization catalyst according to claim 1, wherein said at least hydrogenation/dehydrogenation component comprises platinum and said alkali metal comprises sodium.

7. An isomerization catalyst, consisting essentially of:
a base of tungstated zirconia;
a hydrogenation/dehydrogenation component loaded on the base, the hydrogenation/dehydrogenation component including at least one metal selected from the group consisting of platinum, palladium, ruthenium, rhodium, iridium, and osmium; and
an alkali metal impregnated on the hydrogenation/dehydrogenation component-loaded base, wherein the catalyst comprises, by weight:
between about 10-20% tungstate;
between about 0.1-3.00% hydrogenation/dehydrogenation component;
between about 0.01-1.00% alkali metal; and
the balance being zirconia.

8. The isomerization catalyst according to claim 7, wherein said at least one metal hydrogenation/dehydrogenation component is selected from the group consisting of platinum and palladium.

9. The isomerization catalyst according to claim 7, wherein said at least one metal hydrogenation/dehydrogenation component comprises platinum.

10. The isomerization catalyst according to claim 7, wherein said alkali metal is selected from the group consisting of lithium, sodium, potassium, rubidium, cesium, and mixtures thereof.

11. The isomerization catalyst according to claim 7, wherein said alkali metal is selected from the group consisting of lithium, sodium, potassium, and mixtures thereof.

12. The isomerization catalyst according to claim 7 wherein said at least hydrogenation/dehydrogenation component comprises platinum and said alkali metal comprises sodium.

* * * * *